United States Patent
Han et al.

(10) Patent No.: US 9,999,050 B2
(45) Date of Patent: Jun. 12, 2018

(54) RESOLUTION METHOD FOR CONFLICT OF FIRING PHASE ALLOCATION IN BIO-INSPIRED DISTRIBUTED WIRELESS RESOURCE ALLOCATION METHOD

(71) Applicants: Myoung-hun Han, Daejeon (KR); Bongsoo Roh, Sejong (KR); Eunhyoung Lee, Sejong (KR); Mijeong Hoh, Daejeon (KR); Chanyi Park, Daejeon (KR); Hyungseok Choi, Sejong (KR)

(72) Inventors: Myoung-hun Han, Daejeon (KR); Bongsoo Roh, Sejong (KR); Eunhyoung Lee, Sejong (KR); Mijeong Hoh, Daejeon (KR); Chanyi Park, Daejeon (KR); Hyungseok Choi, Sejong (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 103 days.

(21) Appl. No.: 15/231,848

(22) Filed: Aug. 9, 2016

(65) Prior Publication Data

US 2017/0196006 A1  Jul. 6, 2017

(30) Foreign Application Priority Data

Dec. 31, 2015 (KR) .......................... 10-2015-0191520

(51) Int. Cl.
*H04W 72/04* (2009.01)
*H04W 72/08* (2009.01)
(Continued)

(52) U.S. Cl.
CPC ....... *H04W 72/0446* (2013.01); *H04L 5/0032* (2013.01); *H04L 5/0089* (2013.01);
(Continued)

(58) Field of Classification Search
CPC ............... H04L 5/0032; H04L 5/0089; H04W 72/0446; H04W 72/046; H04W 72/048; H04W 72/085; H04W 74/0841
See application file for complete search history.

(56) References Cited

U.S. PATENT DOCUMENTS

| | | | |
|---|---|---|---|
| 2013/0237264 A1* | 9/2013 | Kasslin | H04W 16/14 455/509 |
| 2014/0036810 A1* | 2/2014 | Harrison | H04W 72/042 370/329 |

(Continued)

FOREIGN PATENT DOCUMENTS

KR  1020110098825 A  9/2011

OTHER PUBLICATIONS

"A study on the Conflict Resolution of the Firing Phase Allocation in Bio-inspired Distributed Wireless Resource Allocation Method", Fall Conference, Korea Institute of Military Science and Technology (Nov. 23, 2015).

(Continued)

*Primary Examiner* — Brian D Nguyen
(74) *Attorney, Agent, or Firm* — Scully Scott Murphy and Presser

(57) ABSTRACT

The present invention relates to a bio-inspired distributed wireless resource allocation, and a method of solving a conflict of a firing phase allocation in the bio-inspired distributed wireless resource allocation includes (a) selecting a reference firing phase having a preset degree of allocation-available space, on the basis of firing phase allocation information within a received firing message, when a newly-entered node attempts the firing phase allocation, (b) calculating changeable positions of the reference firing phase and a succeeding firing phase of the reference firing phase under assumption set based on the firing phase allocation information, and (c) setting a space between the
(Continued)

changeable positions as an allocation-available range and allowing the newly-entered node to be allocated with an arbitrary firing phase within the allocation-available range.

9 Claims, 5 Drawing Sheets

(51) Int. Cl.
*H04L 5/00* (2006.01)
*H04W 74/08* (2009.01)

(52) U.S. Cl.
CPC ....... *H04W 72/046* (2013.01); *H04W 72/048* (2013.01); *H04W 72/085* (2013.01); *H04W 74/0841* (2013.01)

(56) References Cited

U.S. PATENT DOCUMENTS

| | | | | |
|---|---|---|---|---|
| 2014/0039531 A1* | 2/2014 | Kovach | ................ | A61B 17/083 606/157 |
| 2015/0257141 A1* | 9/2015 | Kulal | ................ | H04W 72/0406 370/329 |
| 2015/0326492 A1* | 11/2015 | Jeong | ................ | H04W 74/0866 370/329 |
| 2015/0381453 A1* | 12/2015 | Skjolsvold | .......... | H04L 43/0876 709/224 |
| 2016/0283270 A1* | 9/2016 | Amaral | ................. | G06F 9/5027 |

OTHER PUBLICATIONS

Kim, Young-Jae, et al.; "Bio-Inspired Resource Allocation Schenme for Muli-Hop Networks"; The Journal of Korean Institute of Communications and Information Sciences; 15-10, vol. 40, No. 10, Aug. 15, 2015, pp. 2035-2046.

Korean Office Action dated Sep. 12, 2017 issued in corresponding Korean Patent Appln. No. 10-2015-0191520.

Young, J.J. et al. "Weighted DESYNC for Efficient Distributed Wireless Resource Allocation", Korea Electronics and Telecommunications Research Institute Conference (Winter), (2015), pp. 445-446, with English Abstract.

* cited by examiner

EXAMPLE OF COMPLEX FIRING
PHASE ALLOCATION CONFLICT

NETWORK TOPOLOGY

F - FRAME FIRING PHASE ALLOCATION INFORMATION
WITHIN RECEIVED FIRING MESSAGE

F+1 - FRAME FIRING PHASE ALLOCATION INFORMATION
WITHIN RECEIVED FIRING MESSAGE

RESOLUTION METHOD FOR CONFLICT OF FIRING PHASE ALLOCATION IN BIO-INSPIRED DISTRIBUTED WIRELESS RESOURCE ALLOCATION METHOD

CROSS-REFERENCE TO RELATED APPLICATION

Pursuant to 35 U.S.C. § 119(a), this application claims the benefit of priority of Korean Patent Application No. 10-2015-0191520, filed on Dec. 31, 2015, the contents of which are incorporated by reference herein in its entirety.

BACKGROUND OF THE INVENTION

1. Field of the Invention

This specification relates to a bio-inspired distributed wireless resource allocation method.

2. Background of the Invention

Bio-inspired algorithms refer to algorithms for solving general problems by modeling natural phenomena of an ecological system which performs functions, such as maintenance, management and synchronization of the entire ecological system by obeying very simple and a less number of behavior rules.

A bio-inspired resource allocation method is a method in which a desynchronization as one of the bio-inspired algorithms is applied to a wireless resource allocation. The desynchronization is a method by which nodes on a network are allocated with time slots, without collision, through periodic firing message exchange. This method has avoided the collision by continuously controlling resources to be occupied through relationship among the nodes even under environments of frequent entry and exit of the nodes, and provided high channel utilization. However, the bio-inspired resource allocation method does not support a multi-hop environment.

In 'Bio-inspired distributed wireless resource allocation method' that the bio-inspired resource allocation method extends to the multi-hop environment, control messages have been exchanged in a periodic manner and resources to be allocated have been controlled by considering 2-hop neighboring nodes per two frames. Accordingly, high channel utilization has been provided without data collision. However, due to new entry and movement of nodes, a firing phase allocation collision which results from the nodes attempting to occupy the same firing phase is likely to be caused.

To solve this problem, a method in which each of nodes whose firing phase allocation conflicts reattempts to occupy the firing phases. This, however, causes a delay until the firing phase is reallocated. Also, other nodes which are unable to recognize such collision of the firing phase allocation determine that related data slots are used by the corresponding firing phase and accordingly do not use the related data slots. This results in a waste of data slots.

SUMMARY OF THE INVENTION

Therefore, the present invention is to solve the aforementioned problems and other drawbacks. Another aspect of the detailed description is to provide a method of solving a conflict of firing phase allocation in a bio-inspired distributed wireless resource allocation method, namely, to optimize QoS performance in a resource allocation under a wireless mobile multi-hop environment in a manner of minimizing a data transmission delay and a node entry delay which are likely to happen under a condition that firing phase allocation conflicts, and allowing an efficient use of resources without a waste of data slots.

In detail, the present invention proposes a method of solving a problem that nodes allocated with the same firing phase due to movements and new entries fail to be allocated with data slots for a predetermined time during reoccupation of the firing phase due to a conflict of the firing phase allocation, and allowing the nodes to directly enter a network to be allocated with data slots.

To this end, the present invention proposes a method in which nodes whose firing phase allocation is to conflict share the data slots to be allocated from the conflicted firing phases without collision in a manner of allowing a node, which has detected the allocation conflict of the firing phase, to recognize and mediate the situation that the firing phase allocation conflicts.

Also, the present invention proposes a method of allowing a newly-entered node to occupy a location at which the node can avoid firing phase collision against existing nodes to reduce the probability of a conflict of firing phase allocation.

In addition, the present invention proposes a priority algorithm for equalizing mediations, which are likely to be differently generated for one firing phase allocation conflict, and a solution of a conflict of mediations for different allocation conflicts.

When the firing phase collision is solved, a reallocation delay and a waste of data slots caused due to entry collision and movement collision can be reduced, thereby improving reactivity of a network and enhancing QoS performance.

To achieve these and other advantages and in accordance with the purpose of this specification, as embodied and broadly described herein, there is provided a method of solving a conflict of a firing phase allocation in a bio-inspired distributed wireless resource allocation, the method including (a) selecting a reference firing phase having a preset degree of allocation-available space, on the basis of firing phase allocation information within a received firing message, when a newly-entered node attempts the firing phase allocation;

(b) calculating changeable positions of a succeeding firing phase of the reference firing phase under assumption set based on the firing phase allocation information; and (c) setting a space between the changeable positions as an allocation-available range and allowing the newly-entered node to be allocated with an arbitrary firing phase within the allocation-available range.

In an embodiment disclosed herein, the step (b) may include setting as the assumption a state that the reference firing phase, the succeeding firing phase, and a firing phase adjacent to the succeeding firing phase by a preset degree have been allocated.

In another embodiment disclosed herein, the step (a) may include allowing an existing node to be allocated, as a firing phase, with a midpoint between a preceding firing phase and a succeeding firing phase of a currently-allocated firing phase, when the existing node attempts the firing phase allocation.

In accordance with another aspect of the preset invention, a method of solving a conflict of a firing phase allocation in a bio-inspired distributed wireless resource allocation may include (a) adding a mediation bit of a preset size to a firing message, (b) calculating a priority of an allocation-conflicted node, in response to a reception of the firing phase allocation conflict, setting a mediation for the allocation conflict, and generating a firing message to transmit, in a preset frame sequence bit, and (c) transmitting data through a pre-allocated data slot in a data slot time, and transmitting the generated firing message in a control slot time.

In accordance with another aspect of the preset invention, a method of solving a conflict of a firing phase allocation in a bio-inspired distributed wireless resource allocation may include (a) adding a mediation bit of a preset size to a firing message, (b) receiving mediation information regarding a firing phase allocation conflict in a preset frame sequence bit, and checking an occurrence or non-occurrence of a complex firing phase allocation conflict corresponding to a plurality of allocation conflicts, on the basis that a corresponding node is an allocation-conflicted node, (c) allowing the corresponding node to be allocated with only a data slot corresponding to the allocation-conflicted firing phase, on the basis of the occurrence of the complex firing phase allocation conflict and an occurrence of a collision of a plurality of allocation mediations, and (d) transmitting only data with low priority through the allocated data slot in a data slot time, and transmitting firing phase allocation information through a firing message in a control slot time.

In an embodiment disclosed herein, the step (c) may include allowing the allocation-conflicted node to be allocated with data slots from a midpoint slot between the allocation-conflicted firing phase and a preceding firing phase of the allocation-conflicted firing phase to a slot just before the allocation-conflicted firing phase, on the basis that the complex firing phase allocation conflict or the collision of the plurality of allocation mediations does not occur, and the allocation-conflicted node is a node with the highest priority.

In another embodiment disclosed herein, the step (c) may include allowing the allocation-conflicted node to be allocated with data slots from a slot just after the allocation-conflicted firing phase to a midpoint slot between the allocation-conflicted firing phase and a succeeding firing phase of the allocation-conflicted firing phase, on the basis that the complex firing phase allocation conflict or the collision of the plurality of allocation mediations does not occur, and the allocation-conflicted node is a node with the second highest priority.

In another embodiment disclosed herein, the step (d) comprises:

changing an allocation position to a midpoint of the allocated data slots, transmitting data through the allocated data slots in the data slot time, and transmitting changed firing phase allocation information through the firing message in the control slot time.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, moreover, the detailed description will be omitted when a specific description for publicly known technologies to which the invention pertains is judged to obscure the gist of the present disclosure. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Hereinafter, description will be given of related embodiments with reference to the accompanying drawings. It will be obvious to those skilled in the art that the present invention can be specified into other specific forms without departing from the scope and essential features of the present invention.

The present invention proposes a firing phase allocation method capable of preventing an occurrence of a conflict of firing phase allocation between a newly-entered node and existing nodes, in order to avoid a situation that a great number of nodes try to occupy one firing phase.

The prior art (Bio-inspired distributed wireless resource allocation) has used a method of randomly selecting a non-used firing phase based on a currently-received firing message.

However, it is impossible that all the nodes change their own firing phases according to allocation information about firing phases preceding and succeeding their firing phases and a specific node precisely predicts firing phase change information of neighboring nodes. Therefore, even though a firing phase which is currently not used is occupied, a firing phase, allocation of which has been attempted, may change into a currently-used state.

Figure 1:
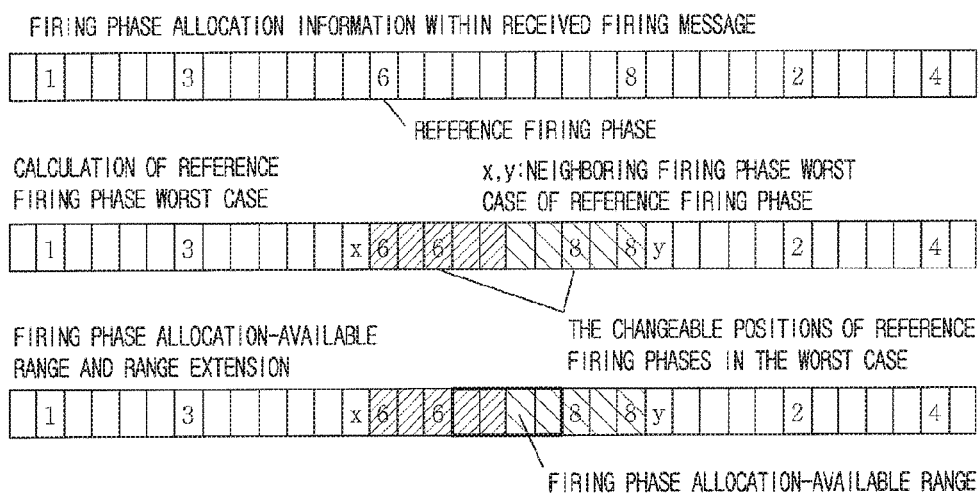
FIG. 1 is a conceptual view illustrating an embodiment of a firing phase allocation method of a new node in accordance with the present invention.

Therefore, the present invention proposes a firing phase allocation method of a new node, as illustrated in FIG. 1.

FIG. 1 is a conceptual view illustrating an embodiment of a firing phase allocation method of a new node in accordance with the present invention.

As illustrated in FIG. 1, considering a conflict of firing phase allocation with existing nodes, the worst case where firing phases of the existing nodes are changeable is calculated, and one of firing phases which avoids the allocation conflict is arbitrarily selected.

Figure 2:
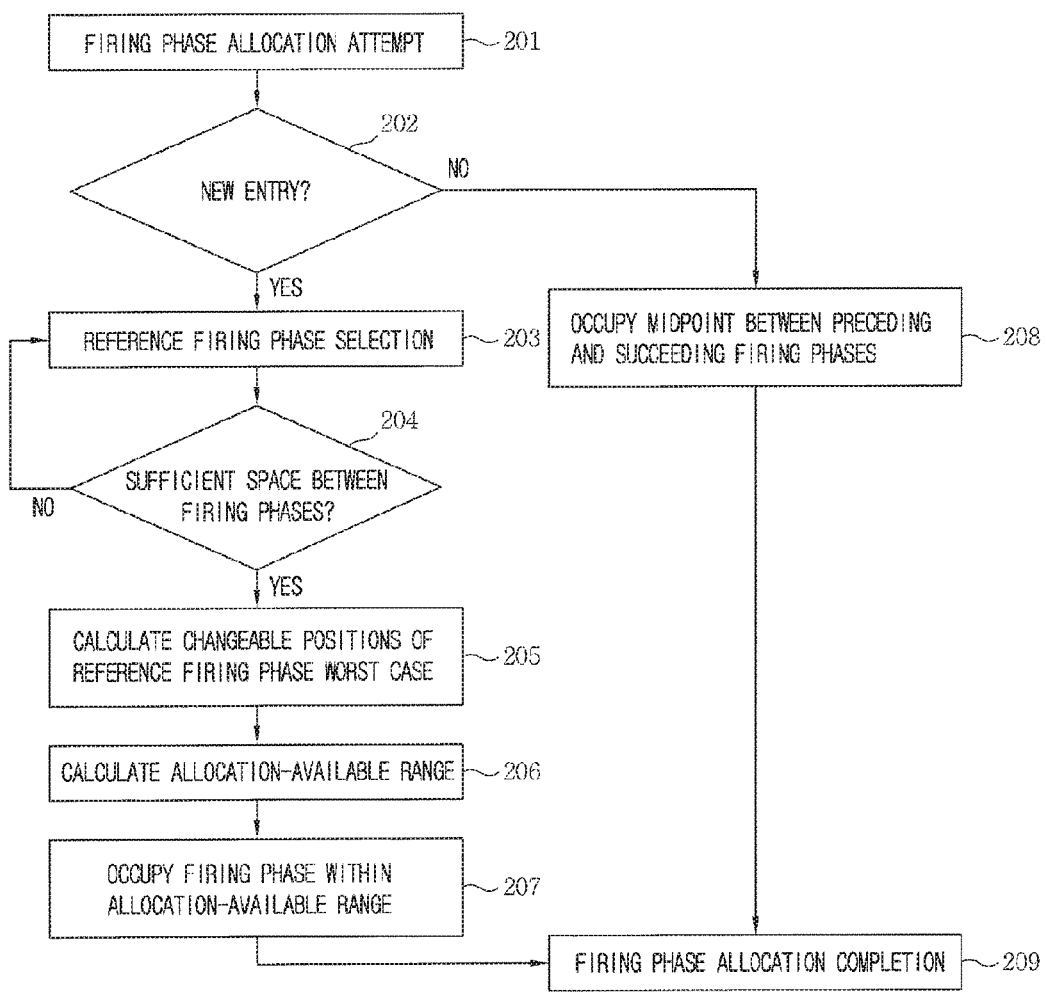
FIG. 2 is a flowchart illustrating an embodiment of a firing phase allocation method of a new node in accordance with the present invention.

FIG. 2 is a flowchart illustrating an embodiment of a firing phase allocation method of a new node in accordance with the present invention.

As illustrated in FIG. 2, first, when a node attempts to occupy a firing phase (201), it is determined whether the allocation attempt is made by a new entry or made for changing a position of a previously-allocated firing phase (202).

When the firing phase allocation is made for the new entry, a reference firing phase is arbitrarily selected from firing phase allocation information within a received firing message (203). In this manner, the arbitrary selection of the reference firing phase is to lower a conflict possibility of the firing phase allocation with a simultaneously-entered node.

Afterwards, it is checked whether or not there is a sufficient space between the selected reference firing phase and a subsequent firing phase of the reference firing phase (204).

When the space between the firing phases is insufficient, namely, when the space fails to satisfy a predetermined criterion, the procedure goes back to the step 203 and the reference firing phase changes. This is for preventing an increase in the conflict possibility of the firing phase allocation due to a less number of selectable allocation candidates when the simultaneously-entered node selects the same reference firing phase.

On the other hand, upon selecting a reference firing phase with a sufficient allocable space, the worst case of the allocation changeable positions of the reference firing phase and the subsequent firing phase is calculated (205). This is because the reference firing phase, the subsequent firing phase and firing phases adjacent to the subsequent firing phase are also in an allocated state.

Once calculating the changeable positions of the firing phases in the worst case, a space between the changeable positions is set as an allocation-available range (206).

Afterwards, an arbitrary firing phase within the allocation-available range is allocated (207), and the firing phase allocation is completed (209).

On the other hand, when the allocation is not the firing phase allocation due to the new entry in the step 202, a midpoint between preceding and succeeding firing phases of the currently-allocated firing phase is occupied (208). Accordingly, the firing phase allocation is completed (209).

Meanwhile, even though the firing phase allocation method illustrated in FIG. 2 is used, a firing phase allocation conflict may be caused due to a movement of a node and a simultaneous entry of a new node.

When the firing phase allocation conflicts, the conflict information may not be transferred to all of the neighboring nodes. Accordingly, if a node which has received the firing phase allocation conflict information and a node without receiving such information are allocated with different data slots, a data collision is caused.

Therefore, the data slot allocation is performed under assumption that conflicted firing phases have been allocated to the neighboring nodes. That is, the data slot is wasted by the firing phases from which the firing phase allocation conflict has occurred.

The present invention proposes a method by which nodes causing the allocation conflict use data slots, which are to be wasted by allocation-conflicted firing phases, in a dividing manner, other than reallocating the firing phase when the firing phase allocation conflicts.

To this end, the present invention has added a mediate bit with a size of one bit to a control message. An intermediate node which has detected the firing phase allocation conflict decides orders of the allocation conflict-caused nodes according to mediate priorities.

The intermediate node sets a node with the highest priority in a firing phase from which the allocation conflict has occurred, and sets a node with the second highest priority in a firing phase just subsequent to the allocation conflict-caused firing phase. In this instance, a mediation bit is also set.

Nodes except for a node corresponding to an ID of a firing phase with the set mediation bit and a node corresponding to an ID of a preceding firing phase of the mediation bit-set firing phase, among nodes which have received the firing message including the mediation, ignore the mediation bit-set firing phase and are allocated with data slots in the conventional manner.

The node corresponding to the ID which has occupied the preceding firing phase of the mediation bit-set firing phase is allocated with data slots located before its firing phase, and the node corresponding to the ID of the mediation bit-set firing phase is allocated with data slots located after a firing phase which the node has attempted to occupy. In this instance, a data slot located at the mediation bit-set firing phase is not used, and the reason will be explained later in detail.

Figure 3:
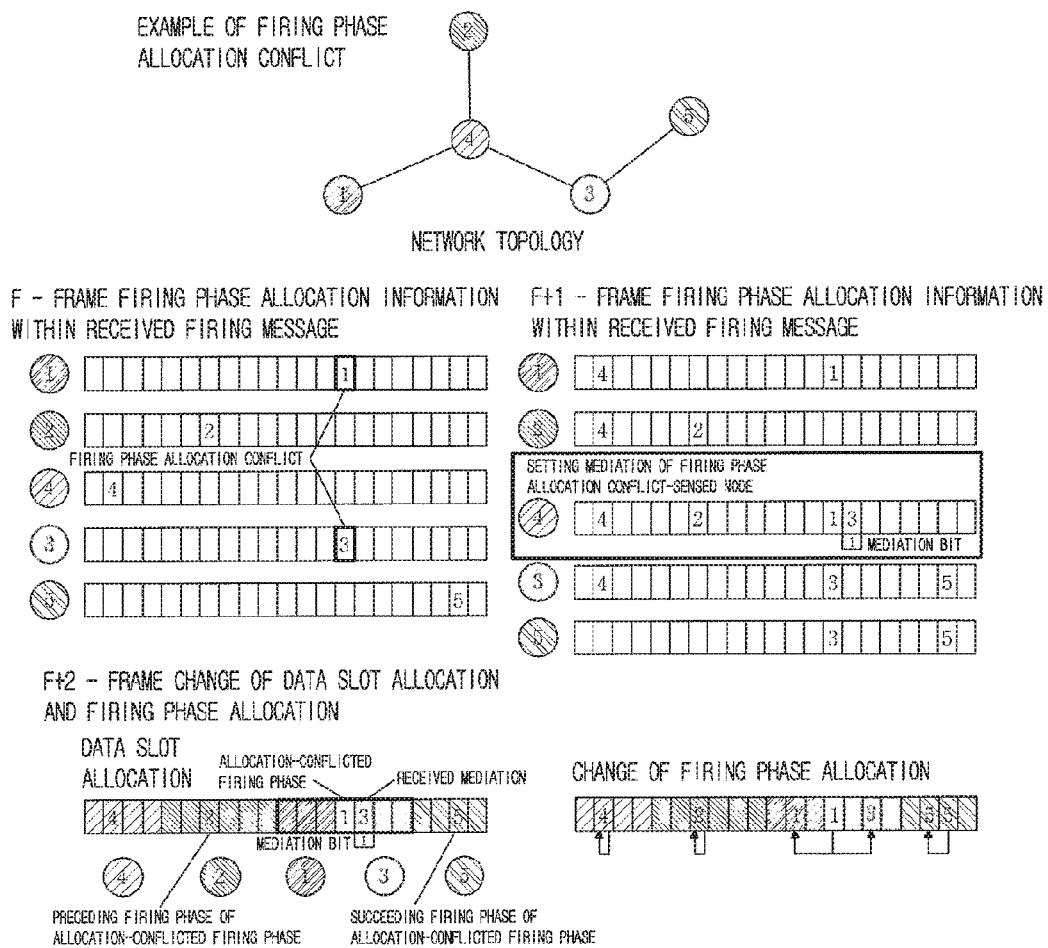
FIG. 3 is a conceptual view illustrating an embodiment of a method of processing a conflict of firing phase allocation in accordance with the present invention.

FIG. 3 is a conceptual view illustrating an embodiment of a method of processing a firing phase allocation conflict in accordance with the present invention.

As illustrated in FIG. 3, when one or more nodes have detected the firing phase allocation conflict, it should be set to avoid a reception of different mediations from two detection nodes. That is, mediation priorities should be equally calculated based on information regarding allocation conflict-caused nodes (i.e., allocation conflict nodes) such that the mediation priorities cannot change according to position of the nodes.

Meanwhile, information that can be received by the mediation node through the firing message may include a node ID, control slot allocation information, firing phase allocation information, hop information and the like.

As an embodiment, priorities may be decided by using node IDs which are intuitively usable. In detail, a node whose ID has the smallest number may have the highest priority, and a node whose ID has the greatest number may have the second highest priority.

In this manner, the highest priority and the second highest priority are used because the firing phase allocation conflicts among three or more nodes are likely to occur when movements of nodes are complicated, although the collision with a newly-entered node is prevented. Nodes which do not correspond to the highest priority and the second highest priority attempt to occupy new firing phases when changing the firing phase allocation later.

Figure 4:
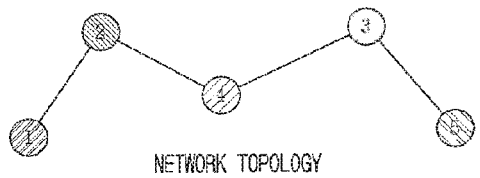
FIG. 4 is a conceptual view illustrating an embodiment related to a complex firing phase allocation conflict.
Figure 4:
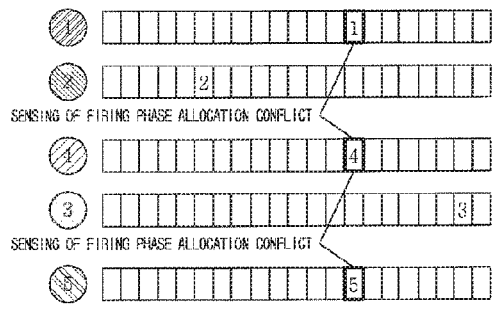
Figure 4:
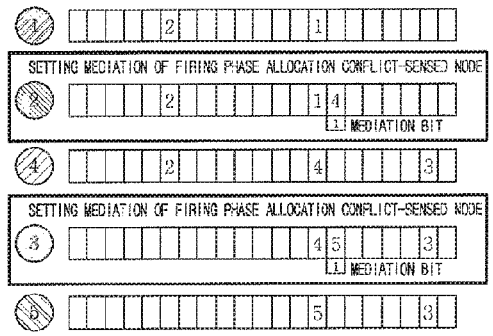

FIG. 4 is a conceptual view illustrating an embodiment related to a complex firing phase allocation conflict.

As illustrated in FIG. 4, the complex firing phase allocation conflict refers to a case where several firing phase allocation conflicts occur and there is an allocation conflict node which has simultaneously received mediations for the different firing phase allocation conflicts.

As an embodiment, a node 4 may receive mediations from a node 2 and a node 3, and a situation may occur in which the node 4 has different priorities in the two mediations. In this instance, when one of the two mediations is adopted, the one mediation conflicts with the other mediation. Therefore, both of the mediations cannot be adopted. This is referred to as 'firing phase allocation mediation conflict.'

The present invention proposes a method in which a corresponding node uses a data slot of a firing phase with the allocation conflict occurred when the firing phase allocation mediation conflict occurs. This is a method in which a node is allocated with only one data slot but can use the data slot without a delay required for reallocation.

However, the firing phase allocation mediation conflict with respect to the same firing phase may also occur with an extremely low possibility. Therefore, the node on which the firing phase allocation mediation conflict has occurred should prepare any possible data collision by holding a transmission of data which requires for collision-free transmission.

Figure 5:
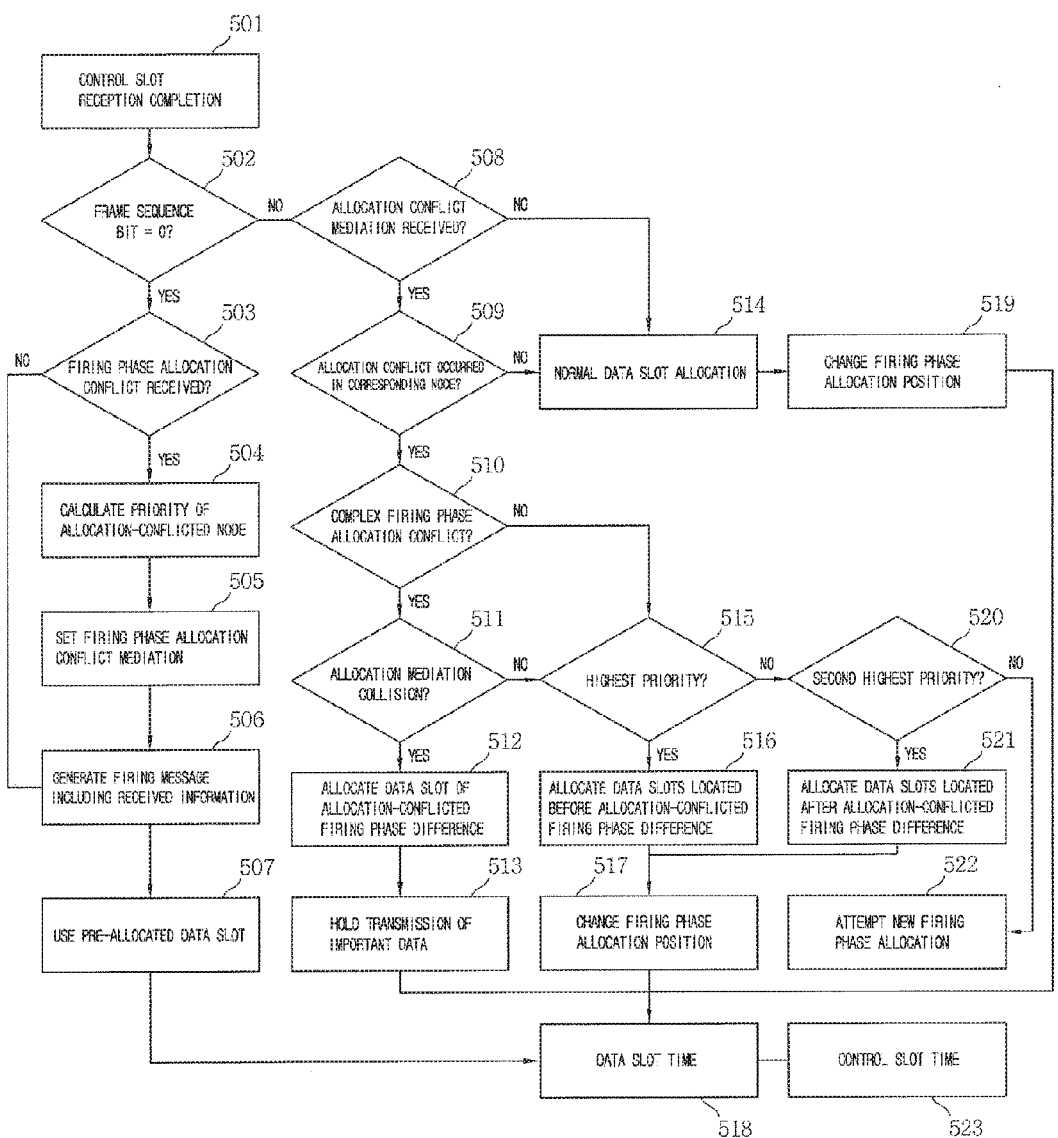
FIG. 5 is a flowchart illustrating an embodiment of procedures of mediating firing phase allocation and allocating data slots in accordance with the present invention.

FIG. 5 is a flowchart illustrating an embodiment of procedures of mediating firing phase allocation conflicts and allocating data slots in accordance with the present invention.

As illustrated in FIG. 5, every node receives every control slot (501).

Afterwards, a frame sequence bit is checked in order to have a different behavior according to a frame period. In detail, whether or not a frame sequence bit is '0' is determined (502).

When the frame sequence bit is '0' in the step 502, it is determined whether or not the firing phase allocation conflict is indicated in a received firing message (503).

When the firing phase allocation has conflicted, priorities of allocation conflict-caused nodes (i.e., allocation conflict nodes) are calculated (504).

Next, mediation for the firing phase allocation conflict is set (505), and a firing message to be transmitted at the next time is written (506).

On the other hand, when the firing phase allocation has not conflicted in the step 503, the procedure goes directly to the step 506 to generate the firing message.

Afterwards, a previously-allocated data slot is reallocated (507), data is transmitted through the allocated data slot in a data slot time (508), and the generated firing message is transmitted in a control slot time (523).

Meanwhile, when the frame sequence bit '1' in the step 502, the procedure goes to the step 508. Whether or not the received firing message includes mediation information related to the firing phase conflict is checked in the step 508.

When the firing phase conflict mediation information is received, whether of the allocation has conflicted in the corresponding node is checked (509).

When the allocation information of the corresponding node has not conflicted in the step 509 or the allocation conflict mediation information has not been received in the step 508, the procedure goes to a step 514 to normally allocate a data slot. And, the corresponding node decides an allocation position of its next firing phase based on the allocated data slot (519).

Afterwards, data is transmitted (518), and changed firing phase allocation information is transmitted through the firing message (523).

Meanwhile, the node which has checked the allocation conflict with respect to its firing phase goes to the step 510 and checks whether or not a complex firing phase allocation conflict has occurred.

When the complex firing phase allocation conflict has occurred in the step 510, the node checks whether or not allocation mediations are set differently (511).

When an allocation mediation collision is checked in the step 511, only a data slot corresponding to a firing phase which the node tries to occupy is allocated (512).

Next, to prepare a situation that the conflict is likely to occur, a transmission delay for important data is set (513).

Afterwards, the node transmits data with low priority through a data slot which has been allocated in a data slot time (518), and transmits its firing phase allocation information using the firing message in the control slot time (523).

On the other hand, when the complex firing phase allocation conflict has not occurred in the step 510, or when the allocation mediation conflict has not occurred in the step 511, the procedure goes to the step 515. The node then checks the allocation mediation and determines whether or not the highest priority is set therefor in the allocation mediation (515).

In the step 515, the node with the highest priority set therefor is allocated with data slots from a midpoint slot between the allocation-conflicted firing phase and the preceding firing phase to a data slot just before the allocation-conflicted firing phase (516).

Afterwards, the node changes the firing phase allocation position to a midpoint of the allocated data slots (517), and transmits data through the allocated data slots (518). And, the node transmits its changed firing phase allocation information through the firing message (523).

In the meantime, the node without the highest priority set therefor in the step 515 checks whether or not the second highest priority has been set therefor (520). The node with the second highest priority set therefor is allocated with data slots from a slot just after the allocation-conflicted firing phase to a midpoint slot between the allocation-conflicted firing phase and the succeeding firing phase (521).

Afterwards, the node changes the firing phase allocation position to a midpoint of the allocated data slots (517), and transmits data through the allocated data slots (518). And, the node transmits its changed firing phase allocation information through the firing message (523).

On the other hand, when the node does not correspond to the second highest priority in the step 520, the procedure goes to the step 522 to calculate a firing phase to occupy, similar to a new firing phase allocation.

Afterwards, even though going to the step 518, the node cannot transmit data because of failing to be allocated with a data slot. Then, the node transmits the firing message for occupying a new firing phase through the control slot time in the step 523.

A method of solving a firing phase allocation conflict in a bio-inspired distributed wireless resource allocation according to the present invention will provide the following effects.

The present invention has proposed a method of solving an allocation conflict for minimizing reallocation when a firing phase allocation conflicts, a method in which a new node occupies a firing phase to reduce possibility of a firing phase allocation conflict, and a method of solving a complex firing phase allocation conflict and an allocation mediation conflict, in the bio-inspired distributed wireless resource allocation.

According to at least one of the embodiments of the present invention, data communication delay which may be caused due to the firing phase allocation conflict in the bio-inspired distributed wireless resource allocation can be solved.

According to at least one of the embodiments of the present invention, a waste of wireless resources caused due to the firing phase allocation conflict can be prevented, thereby enhancing efficiency of the wireless resources.

And, an entry delay of a new node due to the firing phase allocation conflict can be solved. This may result in optimizing quality of service (QoS) performance under a wireless mobile multi-hop environment.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of solving a conflict of a firing phase allocation in a bio-inspired distributed wireless resource allocation, the method comprising:
   (a) selecting a reference firing phase having a preset degree of allocation-available space, on the basis of firing phase allocation information within a received firing message, when a newly-entered node attempts the firing phase allocation;
   (b) calculating changeable positions of the reference firing phase and a succeeding firing phase of the reference firing phase under assumption set based on the firing phase allocation information; and
   (c) setting a space between the changeable positions as an allocation-available range and allowing the newly-entered node to be allocated with an arbitrary firing phase within the allocation-available range.

2. The method of claim 1, wherein the step (b) comprises: setting as the assumption a state that the reference firing phase, the succeeding firing phase, and a firing phase adjacent to the succeeding firing phase by a preset degree have been allocated.

3. The method of claim 1, wherein the step (a) comprises: allowing an existing node to be allocated, as a firing phase, with a midpoint between a preceding firing phase and a succeeding firing phase of a currently-allocated firing phase, when the existing node attempts the firing phase allocation.

4. A method of solving a conflict of a firing phase allocation in a bio-inspired distributed wireless resource allocation, the method comprising:
   (a) adding a mediation bit of a preset size to a firing message;
   (b) calculating a priority of an allocation-conflicted node, in response to a reception of a firing phase allocation conflict, setting a mediation for the firing phase allocation conflict, and generating a firing message to transmit, in a preset frame sequence bit; and
   (c) transmitting data through a pre-allocated data slot in a data slot time, and transmitting the generated firing message in a control slot time.

5. A method of solving a conflict of a firing phase allocation in a bio-inspired distributed wireless resource allocation, the method comprising:
   (a) adding a mediation bit of a preset size to a firing message;
   (b) receiving mediation information regarding a firing phase allocation conflict in a preset frame sequence bit, and checking an occurrence or non-occurrence of a complex firing phase allocation conflict corresponding to a plurality of allocation conflicts, on the basis that a corresponding node is an allocation-conflicted node;
   (c) allowing the corresponding node to be allocated with only a data slot corresponding to an allocation-conflicted firing phase, on the basis of the occurrence of the complex firing phase allocation conflict and an occurrence of a collision of a plurality of allocation mediations; and
   (d) transmitting only data with low priority through the allocated data slot in a data slot time, and transmitting firing phase allocation information through a firing message in a control slot time.

6. The method of claim 5, wherein the step (c) comprises: allowing the allocation-conflicted node to be allocated with data slots from a midpoint slot between the allocation-conflicted firing phase and a preceding firing phase of the allocation-conflicted firing phase to a slot just before the allocation-conflicted firing phase, on the basis that the complex firing phase allocation conflict or the collision of the plurality of allocation mediations does not occur, and the allocation-conflicted node is a node with the highest priority.

7. The method of claim 6, wherein the step (d) comprises: changing an allocation position to a midpoint of the allocated data slots, transmitting data through the allocated data slots in the data slot time, and transmitting changed firing phase allocation information through the firing message in the control slot time.

8. The method of claim 5, wherein the step (c) comprises: allowing the allocation-conflicted node to be allocated with data slots from a slot just after the allocation-conflicted firing phase to a midpoint slot between the allocation-conflicted firing phase and a succeeding firing phase of the allocation-conflicted firing phase, on the basis that the complex firing phase allocation conflict or the collision of the plurality of allocation mediations does not occur, and the allocation-conflicted node is a node with the second highest priority.

9. The method of claim 8, wherein the step (d) comprises: changing an allocation position to a midpoint of the allocated data slots, transmitting data through the allocated data slots in the data slot time, and transmitting changed firing phase allocation information through the firing message in the control slot time.

* * * * *